United States Patent [19]

Iwata et al.

[11] Patent Number: 4,590,341
[45] Date of Patent: May 20, 1986

[54] COLUMN MOUNTED SWITCHING DEVICE

[75] Inventors: Masayosi Iwata, Hashima; Yoshikazu Hayashi, Kani; Tadashi Yokoyama, Kuwana, all of Japan

[73] Assignee: Kabushiki Kaisha Tokai-rika-denki-seisakusho, Aichi, Japan

[21] Appl. No.: 642,425

[22] Filed: Aug. 20, 1984

[30] Foreign Application Priority Data

Aug. 22, 1983 [JP] Japan .................. 58-129984[U]
Aug. 22, 1983 [JP] Japan .................. 58-129988[U]

[51] Int. Cl.⁴ ........................................... H01H 3/16
[52] U.S. Cl. ........................... 200/61.54; 200/61.3
[58] Field of Search ............... 200/61.27, 61.3, 61.34, 200/61.35, 61.54

[56] References Cited

U.S. PATENT DOCUMENTS 4,496,810 1/1985 Suzuki et al. .............. 200/61.54
4,503,296 3/1985 Iwata et al. ............... 200/61.34 X Primary Examiner—A. D. Pellinen
Assistant Examiner—Morris Ginsburg
Attorney, Agent, or Firm—Sixbey, Friedman & Leedom

[57] ABSTRACT

In a column mounted switching device mounted on a steering column of a vehicle, a revolution member is supported on a base plate rotatably about a first revolution axis in a first direction, an operation lever is supported on the revolution member rotatably about a second revolution axis directed at a substantially right angle to the first revolution axis, and first switch means is mounted on the base plate such that it is operated in a direction parallel to the second revolution axis by the operation lever through the revolution member. Accordingly, a distance between the first revolution axis and an operation portion of the first switch means is kept sufficiently long so that the first switch means can be operated reliably.

17 Claims, 7 Drawing Figures

COLUMN MOUNTED SWITCHING DEVICE

BACKGROUND OF THE INVENTION

1. Field of the Invention

The present invention relates to a column mounted switching device for such a vehicle as an automobile, mounted on a steering column of the vehicle.

2. Description of the Prior Art

In the column mounted switching device various operation switches such as a turn-signal switch, a dimmer and passing switch and a hazard switch are disposed in such structure because of the ease with which they can be operated.

In U.S. patent application Ser. Nos. 481,787 (now U.S. Pat. No. 4,496,810) and 495,447 (now U.S. Pat. No. 4,503,296) such devices have been proposed. In the device disclosed in U.S. Pat. No. 4,503,296, for example, the dimmer and passing switch 17 is disposed such that, when the knob 16 which is an operation lever is revolved about the pin 15 which is a revolution axis in the direction of arrow D, the operation button 18, i.e., an operation portion of the dimmer and passing switch 17 is operated downwardly by the operation portion 16a of the knob 16 positioned close to the pin 15.

In such devices, thus, a distance between the revolution axis of the operation lever and the operation portion of the dimmer and passing switch is short and, therefore, it is difficult to provide a proper operation stroke distance for the dimmer and passing switch.

SUMMARY OF THE INVENTION

In view of the above fact, it is one object of the present invention to provide a column mounted switching device for a vehicle which is more easily and effectively operated.

In a column mounted switching device for a vehicle according to the present invention, a revolution member is supported on a base plate mounted on a steering column of a vehicle rotatably about a first revolution axis in a first direction, an operation lever is supported on the revolution member rotatably about a second revolution axis directed at a substantially right angle to the first axis in a second direction, and first switch means is mounted on the base plate such that it is operated in a direction parallel to the second revolution axis by the revolution of a forward end portion of a lever portion of the revolution member in the first direction when the operation lever is revolved in the first direction.

Accordingly, a distance between the first revolution axis and an operation portion of the first switch means is kept sufficiently long, to provide an operation stroke distance sufficient so that the first switch means can be operated reliably.

Description will hereinunder be given an embodiment of the present invention with reference to the drawings.

PREFERRED EMBODIMENTS OF THE INVENTION

Figure 1:
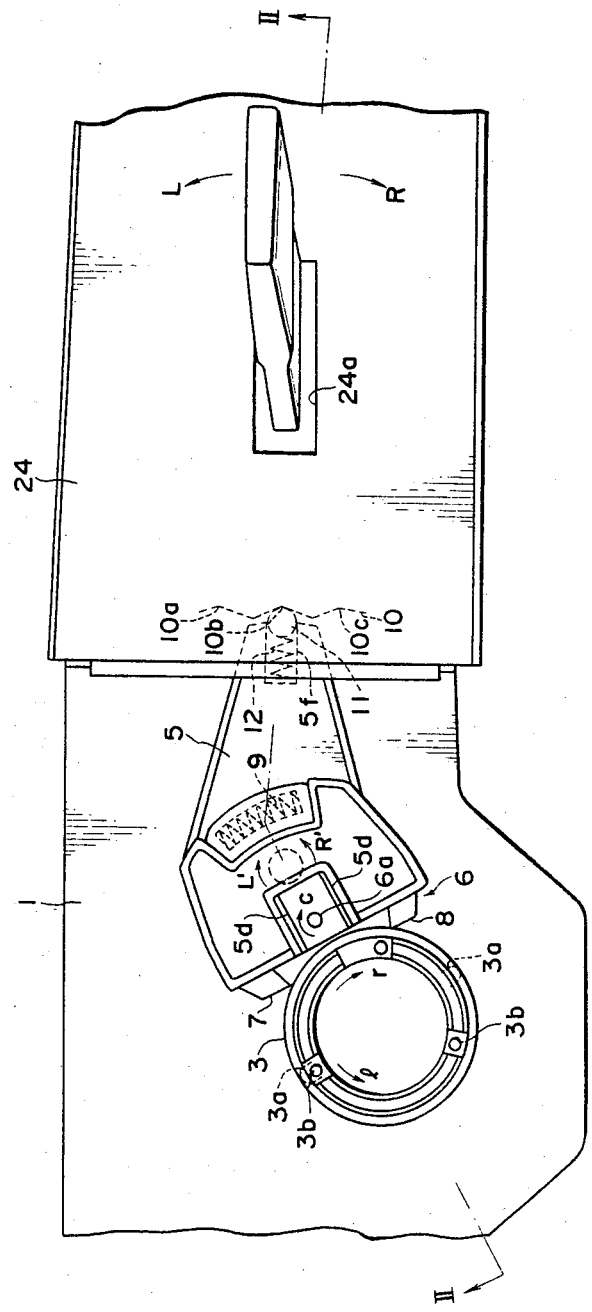
FIG. 1 is a plan view of a first form according to the present invention.
Figure 2:
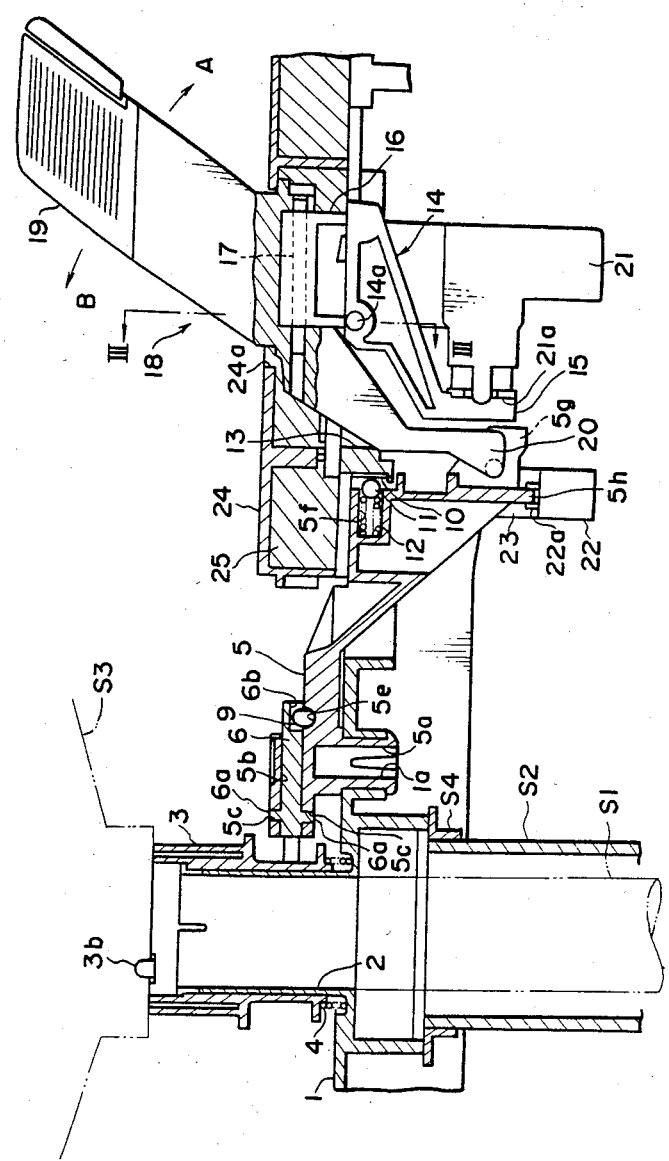
FIG. 2 is a sectional view taken along a line II—II of FIG. 1.

In a first form of the present invention, as shown in FIGS. 1 and 2, a steering column is provided with a steering shaft S1 passing through a column tube S2 and an upper end of the steering shaft S1 is fixed with a steering wheel S3 for operation of an occupant of a vehicle.

Fixed to the column tube S2 is a base plate 1 through steel plate S4 by screws or the like, a tubular portion 2 of which receives the steering shaft S1. Supported rotatably on an outer peripheral portion of the tubular portion 2 is a cancelling cam body 3. The cancelling cam body 3 is formed on an outer periphery thereof with a pair of cam projections 3a and it is also formed at an upper end face with protrusions 3b directed towards a lower face of the steering wheel S3. Confined between a lower end portion of the cancelling cam body 3 and the base plate 1 is a coil spring 4, so that the cancelling cam body 3 is biased in a direction of the lower face of the steering wheel S3 and the protrusions 3b are received in holes formed on the lower face of the steering wheel S3. Accordingly, the cancelling cam body 3 is rotated together with the steering wheel S3.

The base plate is formed with a through-hole 1a in which a cylindrical portion 5a of a bracket 5 is received, whereby the bracket 5 is rotatably supported on the base plate 1. The bracket 5 is formed at one end portion thereof positioned on the side of the cancelling cam body 3 with a supporting recess 5b opened in a direction of the cancelling cam body 3 and having opposite faces parallel substantially to the base plate 1. The supporting recess 5b is formed at the opposite faces with circular holes 5c opposed to each other and it is also formed at both sides of each of the circular holes 5c with slit grooves 5d.

Received in the supporting recess 5b of the bracket 5 is a ratchet 6 formed with a pair of axial portions 6a. The axial portions 6a are received in the circular holes 5c, whereby the ratchet 6 is supported to the bracket 5 rotatably about the axial portions 6a. The ratchet 6 is formed at an end portion thereof positioned on the side of the cancelling cam body 3 with a pair of click portions 7 and 8 so as to surround the cancelling cam body 3. The ratchet 6 is also formed at a lower face of the other end thereof with an arc-shaped recess 6b, and the bracket 5 is also formed at a face thereof opposed to the arc-shaped recess 6b with an arc-shaped groove 5e. Disposed between the arc-shaped recess 6b and the arc-shaped groove 5e is a compression coil spring 9 as is an elastic body, in such a manner that a longitudinal axis of the compression coil spring 9 becomes parallel to the opposite faces of the bracket 5 and the ratchet 6, whereby the ratchet 6 is put in a neutral position relative to the bracket 5. The base plate 1 is formed at a portion thereof opposed to the other end portion of the bracket 5 with a detent wall 10 formed in series with three cam recesses 10a to 10c. The bracket 5 is formed at the other end portion thereof with a blind hole 5f in which a detent ball 11 caused to abut on the detent wall 10 and a coil spring 12 biasing the detent ball 11 in a direction of the detent wall 10 are received. The bracket 5 is further formed at a forward end portion thereof with a connecting groove recess 5g.

The base plate 1 is also formed at a portion thereof opposed to the forward end portion of the bracket 5 with a through-hole 13 having longitudinal sides parallel to each other and formed at about central portions of the longitudinal sides with a pair of supporting recesses 13a opposed to each other. Each of the supporting recesses 13a is formed at its bottom in an arc shape and it is opened at its upper face.

Received in the through-hole 13 of the base plate 1 is a revolution member 14 formed with a pair of axial projections 14a functioning as a first revolution axis, each of which is formed at a forward end portion 14c thereof in a spherical shape. The axial portions 14a are received in the supporting recesses 13a, so that the revolution member 14 is rotatably supported on the base plate 1. The base plate 1 is formed integrally with a pair of projections 13c projected in the supporting recesses 13a. Each of the projections 13c covers an upper peripheral portion of each of the supporting recesses 13a partially, and a lower face 13d thereof is formed in an arc shape so as to correspond to the spherical shape of the forward end portion 14c of the axial portion 14a. A bottom face portion of each of the supporting recesses 13a is formed with a rapping hole 13b (an incident to the plastic moulding operation and otherwise unrelated to the invention) opposed to the projection 13c. The revolution member 14 is also formed with a lever portion 15 elongated towards a back of the base plate 1. The lever portion 15 extends downwardly and obliquely from the vicinity of the axial projections 14a and is formed with a forward end portion extending downwardly. The revolution member 14 is further provided projectingly upwardly with a protrusion portion 16 formed with a through-hole 16a along a longitudinal direction of the protrusion portion 16. Supported rotatably to the protrusion portion 16 is an intermediate portion of an operation lever 18 through a pin 17 which is a second revolution axis. The pin 17 is disposed substantially in parallel to a front face of the base plate 1 and the longitudinal side of the through-hole 13 thereof and at a substantially right angle to the axial portions 14a, i.e., the first revolution axis.

The operation lever 18 is provided with a flat knob portion 19 projected upwardly from the side of the upper face of the base plate 1 and a lever portion 20 projected downwardly from the side of the lower face thereof. The lever portion 20 is received in the connecting groove recess 5g at a forward end portion thereof.

Fixed to a back face of the base plate 1 through such mounting means as a screw is a dimmer and passing switch 21. The dimmer and passing switch 21 is of known type, e.g., like that shown in U.S. Pat. No. 4,496,810 and is provided with an operation button 21a on which the forward end portion of the lever portion 15 of the revolution member 14 abuts, and it is also provided therein with a passing switch portion switched on when the operation button 21a is pushed in and a dimmer switch portion switched to a high beam situation and a low beam situation alternately in accordance with a repeated pushing-in operation of the operation button 21a.

The base plate 1 is also fixed at a back face thereof with a turn signal switch 22 of a sliding type, i.e., of the same type shown in U.S. Pat. Nos. 4,496,810 and 4,503,296, as is second switch means, through a holder 23. An operation portion 22a of the turn signal switch 22 is connected to a projection 5h formed on a forward end portion of the bracket 5, whereby it is slided and operated in accordance with a rotation of the bracket 5 about the cylindrical portion 5a.

The base plate 1 is fixed at its upper face with a cover 24 through such fixing means as screws, and the cover 24 is provided on its back side with an illumination light guide 25. The illumination light guide 25 is caused to abut on a upper face of the base plate 1, so that the axial projections 14a are prevented from getting out of the supporting recesses 13a. Also, the cover 24 is formed at a central portion thereof with a slit hole 24a through which the knob portion 19 of the operation lever 18 is elongated.

In addition, the revolution member 14 is formed with a transverse blind hole 14b in which a detent ball 26 and a coil spring 27 are received. The base plate 1 is formed at a position thereof opposed to the detent ball 26 with a detent step portion 28, and, when the revolution member 14 is revolved in a direction of arrow B by the occupant, he is given an operation feeling.

Description will now be given of an operation of the first form of the invention.

As shown in FIGS. 1 and 2, when the operation lever 18 is put in a neutral position, or an initial position, the operation portion 22a of the turn signal switch 22 is also put at a neutral position, or a switched-off position. At this time, the click portions 7 and 8 of the ratchet 6 are positioned out of a rotation locus of the cam projections 3a of the cancelling cam body 3 and the detent ball 11 is caused to abut on the cam recess 10b of the detent wall 10. Also, the revolution member 14 and the operation lever 18 are put in initial positions of a direction of arrow A by a returning force of the operation button 21a directed towards an anti-pushing-in direction of the operation button 21a.

Next, when the knob portion 19 is operated in a direction of arrow B, a positional relationship between the operation lever 18 and the revolution member 14 is not changed but the revolution of the direction of arrow B of the operation lever 18 is transmitted to the revolution member 14 through the pin 17 and the operation button 21a of the dimmer and passing switch 21 is pushed in by a forward end portion of the lever portion 15 of the revolution member 14, so that the passing switch portion and the dimmer switch portion are simultaneously worked. However, when the operation force of the direction of arrow B to the knob portion 19 is removed, or cancelled, the revolution member 14 and the operation lever 18 are returned back to the initial position by the returning force of the operation button 21a. In addition, when the operation lever 18 is revolved in the direction of arrow B, the lever portion 20 thereof is also revolved in the direction of arrow B but only a connection depth between the forward end portion of the lever portion 20 and the connecting groove recess 5g of the bracket 5 is changed by the revolution of the lever portion 20. Accordingly, the bracket 5 is maintained in the neutral position, so that the operation portion 22a of the turn signal switch 22 is also maintained in the neutral position. Next, when the knob portion 19 is revolved in a direction of arrow R which is a second direction, the operation lever 18 is revolved about the pin 17 in the direction of arrow R but the revolution member 14 is kept in the initial position, i.e., it is not revolved. However, in accordance with the revolution of the direction of arrow R of the operation lever 18, the bracket 5 is also revolved in a direction of arrow R' through the forward end portion of the lever portion 20 and the connecting groove recess 5g of the bracket 5, so that the click portion 7 of the ratchet 6 is moved in a position within the rotation locus of the cam projections 3a of the cancelling cam body 3 and the detent ball 11 is moved and caused to abut on the cam recess 10a of the detent wall 10. Furthermore, in accordance with the revolution of the direction of arrow R of the bracket 5, the operation portion 22a of the turn signal switch 22 is slidingly moved to a position R where a right-side turn signal lamp is switched on to be blinked. In these situations, when the steering wheel S3 is rotated in a direction of arrow r, i.e., in an anti-cancelling direction, the cam projections 3a of the cancelling cam body 3 rotate the ratchet 6 about the axial portions 6a against a biasing force of the compression coil spring 9 in a direction of arrow C even though they are caused to abut against the click portion 7 of the ratchet 6, so that the click portion 7 gets over the cam projections 3a. Thus, the bracket 5 is kept in the position revolved in the direction of arrow R', namely, the detent ball 11 is kept in such a situation to abut on the cam recess 10a. As soon as the click portion 7 gets over the cam projections 3a, the ratchet 6 is revolved in a reverse direction to arrow C, and when the ratchet 6 is put at the neutral position to the bracket 5 the ratchet 6 stops the revolution. Also, even if the ratchet 6 is revolved urgently in the reverse direction and it exceeds the neutral position, a biasing force of the compression coil spring 9 acts upon the ratchet 6 in the direction of arrow C, so that the revolution of the ratchet 6 is restricted and the ratchet 6 is revolved in a direction of the neutral position.

In addition, when the steering wheel S3 is rotated in a direction of arrow l, i.e., in a cancelling direction, one of the cam projection 3a is caused to abut on the click portion 7 and the revolution force of the cancelling cam body 3 is transmitted to the bracket 5 through the ratchet 6, whereby the bracket 5 is revolved in a direction of arrow L' and it is returned back to the neutral position shown in FIGS. 1 and 2. In accordance with the revolution of the direction of arrow L' of the bracket 5, the operation lever 18 and the operation portion 22a of the turn signal switch 22 are also returned back to the neutral positions. Thus, the cancelling cam body 3, the ratchet 6 and the compression coil spring 9 constitute a self-cancelling mechanism and a self-cancelling of the turn signal switch 22 is conducted.

On the other hand, when the knob portion 19 is revolved from the neutral position in a direction of arrow L which is the second direction, the operation lever 18 is also revolved about the pin 17 in the direction of arrow L but the revolution member 14 is not moved, namely, it is kept in the initial position. However, in accordance with the revolution of the direction of the knob portion 19, the bracket 5 is also revolved in a direction of arrow L' through the forward end portion of the lever portion 20 and the connecting recess 5g of the bracket 5, so that the click portion 8 is put in a position within the rotation locus of the cam projections 3a of the cancelling cam body 3 and the detent ball 11 is caused to abut on the cam recess 10c of the detent wall 10. Thereafter, even if the steering wheel S3 is rotated in the direction of arrow r, i.e., in the anti-cancelling direction the bracket 5 is not moved since the ratchet 6 is revolved in the reverse direction to arrow C and the click portion 8 gets over the cam projections. However, when the steering wheel S3 is rotated in the direction of arrow r, i.e., in the cancelling direction, the bracket 5 is revolved in the direction of arrow R' to be returned back to the neutral position, so that the self-cancelling of the turn signal switch 22 is conducted.

Figure 3:
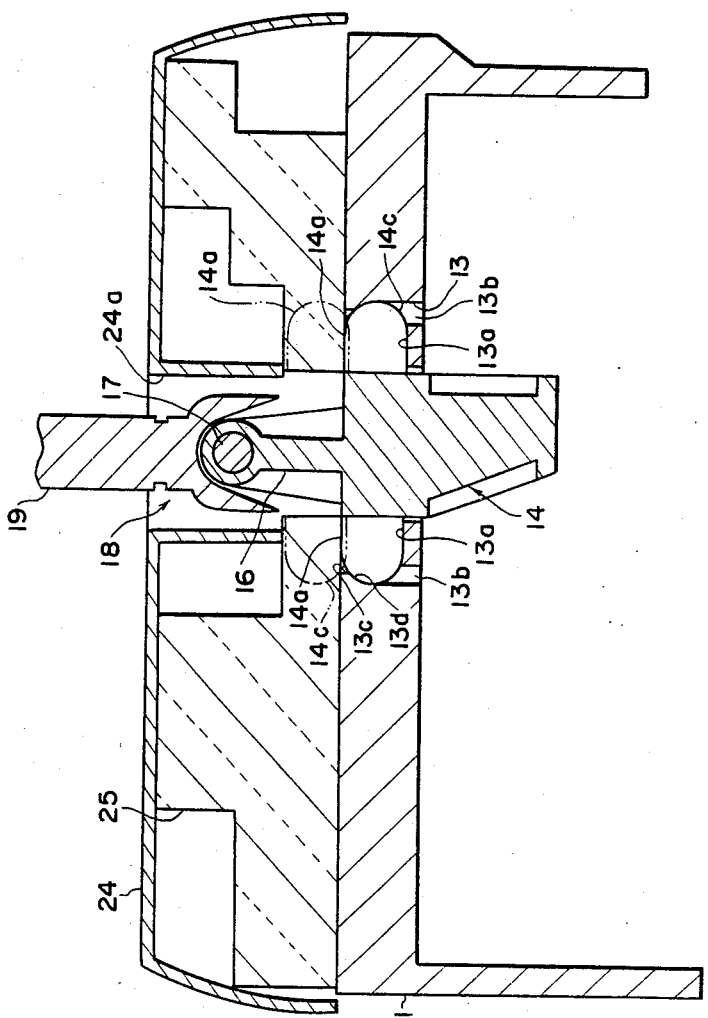
FIG. 3 is a sectional view taken along a line III—III of FIG. 2.
Figure 4:
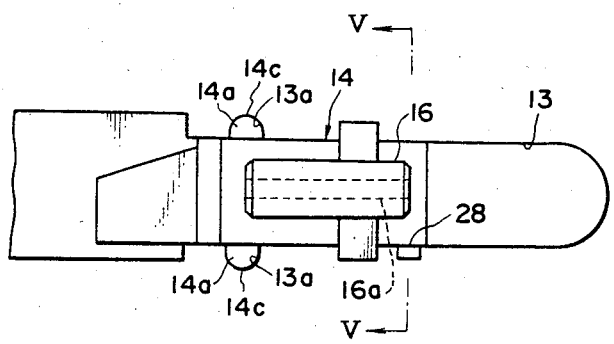
FIG. 4 is a plan view of a main portion of the FIG. 1 device in which a cover and an illumination light guide are removed.
Figure 5:
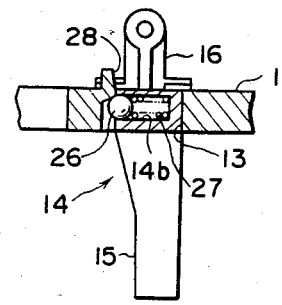
FIG. 5 is a sectional view taken along a line V—V of FIG. 4.

In addition, the revolution member 14 is asembled to the base plate 1 as follows:

The revolution member 14 is inserted in the through-hole 13 of the base plate 1, it is arranged in such a manner that the axial portions 14a are faced to the supporting recesses 13a and positioned on the projections 13c, as shown with a double dotted line in FIG. 3, and, when the revolution member 14 is strongly pushed downwardly, the forward end portions 14c of the axial portions 14a are slided along their spherical faces to enlarge a clearance between the projections 13c and the axial portion 14a are received in the supporting recesses 13a. After the axial portions 14a are received in the supporting recesses 13a, the projections 13c are returned back to their initial, or original, situations due to their own elasticities and the lower faces 13d of the projections 13c force the axial projections 14a downwardly, whereby the axial projections 14a are prevented from getting out of the supporting recesses 13a.

Accordingly, as the axial projections 14a of the revolution member 14 are temporarily held in the supporting recesses 13a, motions of the operation lever 18 can be confirmed and tests of on and off of the dimmer and passing switch 21 and the turn signal switch 22 or the like can also be conducted before the illumination light guide 25 is secured to the base plate 1. Thus, the column mounted switching device can be assembled while the motions of the operation lever 18, the dimmer and passing switch 21 and the turn signal switch 22 are being inspected by the eyes of an assembler, whereby a work of the assembly of the column mounted switching device can be improved.

Next, a modified form of the present invention is described below.

Figure 6:
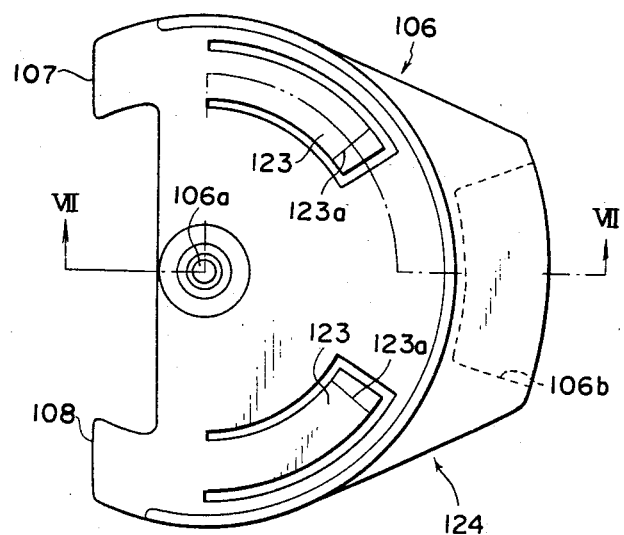
FIG. 6 is an enlarged plan view of a modified form of the invention using a ratchet of a different construction.
Figure 7:
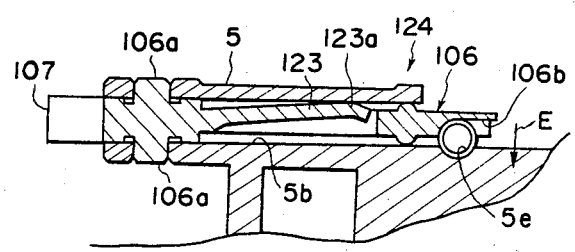
FIG. 7 is a sectional view taken along a line VII—VII of FIG. 6.

In FIG. 6 there is shown another ratchet 106 which is rotatably supported on the bracket 5. The ratchet 106 is formed with a pair of axial portions 106a received in the circular holes 5c and it is formed with an arc-shaped recess 106b receiving the compression coil spring 9 in the same manner as the ratchet 6 of the first embodiment. The ratchet 106 is formed with a pair of click portions 107 and 108 as well as the first embodiment.

In addition, the ratchet 106 is formed about the the axial portions 106a with a pair of arc-shaped elastic arms 123, and the former and the latter are integrally formed from synthetic resin material. Each of the arc-shaped elastic arms 123 is formed in an upward slope shape towards its forward end portion 123a which is caused to dispose elastically above recess defining face 5b. The respective forward end portions 123a are positioned adjacent to the arc-shaped recess 106b of the ratchet 106, and the ratchet 106 is biased downwardly, i.e., in a direction of arrow E, by elastic forces of the arc-shaped elastic arms 123, whereby the recess portion 106b is caused to abut elastically on an upper portion of the compression coil spring 9. Thus, the ratchet 106 constitutes vibration restraining means 124.

Accordingly, for example, in a condition that the knob portion 19 is revolved in the direction of arrow R and the bracket 5 is revolved in the arrow R', so that the ball 11 is caused to abut on the cam recess 10a, when the steering wheel S3 is rotated in the anti-cancelling direction, i.e., in the direction of arrow r, the cam projections 3a are caused to abut on the click portion 107 to move the ratchet 106 so as to compress the compression coil spring 9. In the compressed situation of the compression coil spring 9, one end face thereof is caused to abut on the recess portion 106b and is separated from the recess portion 5e, and the other end faces thereof is caused to abut on the recess portion 5e and is separated from the recess portion 106b. However, when the cam projections 3a are released from the click portion 107, namely the click portion 7 gets over the cam projections 3a, the ratchet 106 is returned back to the neutral position. At the time, the one end face of the compression coil spring 9 urgently abuts on the recess portion 5e and the other end face thereof urgently abuts on the recess portion 106b, whereby the compression coil spring 9 generates vibrations, so that noises occur due to the vibrations of the compression coil spring 9.

In the modified form, however, as a back face of the recess portion 106b of the ratchet 106 is caused to abut elastically on the upper face of the compression coil spring 9, the generation of the vibrations is restrained largely in the compression coil spring 9, so that the occurrence of the noises is also restrained. Furthermore, the number of the vibration which occurs is kept in a low value, so that the occupant can be protected from displeasure due to the noises.

In this modified form the elastic arms 123 are formed on the ratchet 106, but similar elastic arms can be formed on the bracket 5 at positions opposed to the elastic arms 123 instead so as to bias the ratchet 106 in the direction of arrow E. Also other elastic arms can be formed on the ratchet 106 so as to abut elastically on the upper face of the compression coil spring 9. Thus, the vibration restraining means 124 can be modified or changed without departing from the spirit and the scope of the invention.

What is claimed is:

1. A switching device, mounted on a vehicle steering column, said steering column disposed about a steering shaft fixed at its upper end portion with a steering wheel rotationally operated by an occupant of the vehicle, which switching device comprises:
   (a) a base plate mounted on the steering column;
   (b) a revolution member supported to the base plate and rotatable in a first direction about a first revolution axis parallel substantially to an upper face of the base plate, the revolution member including a lever portion extending downward with respect to the disposition of the first revolution axis and a protrusion portion extending upward with respect to the disposition of the first revolution axis;
   (c) an operation lever supported on the protrusion portion of the revolution member and rotatable about a second revolution axis parallel substantially to the upper face of the base plate and, said second revolution axis being disposed substantially at a right angle to the first revolution axis, the operation lever including an occupant operated knob portion extending upward with respect to the disposition of the second axis, and a lever portion extending downward with respect to the disposition of the second axis, both the operation lever and the revolution member being rotatable about the first axis when the operation lever is rotated in a first predetermined direction and only the operation lever being rotated about the second axis when the operation lever is rotated in a second predetermined direction;
   (d) first switch means disposed at a location remote from said first axis and operated in a direction parallel to the second revolution axis by the revolution of a distal portion of the revolution member lever portion in the first direction when the operation lever is revolved in said first direction; and
   (e) second switch means operated by the revolution of the lever portion of the operation lever in the second direction when the knob portion is revolved in the said second predetermined direction, whereby the first switch means can securely be operated by the occupant.

2. A switching device as set forth in claim 1, wherein the first revolution axis is defined by a pair of axial projections formed on the revolution member and rotatably received in a pair of supporting recesses formed on the base plate.

3. A switching device as set forth in claim 2, wherein the second revolution axis is a pin received in a through-hole formed on the protrusion portion of the revolution member in a direction substantially at a right angle to the axial projections.

4. A switching device as set forth in claim 2, wherein each of the axial projections of the revolution member is formed at its distal portion in a spherical shape and the base plate is formed at upper peripheral portions of the supporting recesses with a pair of projections opposed to each other and covering partially upper openings of the supporting recesses, whereby the axial projections of the revolution member can be forced in the supporting recesses to pass between the projections so that the axial projections are prevented from removing from the supporting recesses.

5. A switching device as set forth in claim 1, which further comprises:
   (f) a bracket supported rotatably on the base plate and connected to the operation lever, whreby the second switch means is operated by the revolution of the operation lever in the second predetermined direction through the bracket.

6. A switching device as set forth in claim 5, which further comprises:
   (g) a self-cancelling mechanism including cam means connected to the steering wheel to be rotated together therewith, a ratchet supported juxtaposed with and on the bracket rotatable relative thereto and formed with a pair of click portions opposed to the cam means, and elastic means disposed between the bracket and the ratchet to normally bias the ratchet in a neutral position relative to the bracket, whereby when the operation lever is revolved in the second predetermined direction, the ratchet is revolved together with the bracket and one of the click portions is positioned with a rotation locus of the cam means, so that when the steering wheel is rotated in a cancelling direction of the second switch means the operation lever is returned back to its initial situation through the ratchet and bracket.

7. A switching device as set forth in claim 6, wherein the elastic means is a compression coil spring which is disposed in such a manner that the longitudinal axis thereof is parallel substantially to juxtaposed faces of the bracket and the ratchet, and the ratchet is formed with vibration restraining means causing the ratchet to abut elastically on the outer peripheral face of the compression coil spring, thereby restraining occurrence of vibrations in the compression coil spring when the ratchet is returned to the neutral positon relative to the bracket after it is revolved relative to the bracket.

8. A switching device as set forth in claim 7, wherein the vibration restraining means is a pair of elastic arms formed on the ratchet and abutting against a portion of the bracket to bias the ratchet in the direction of the bracket.

9. a switching device as set forth in claim 1, wherein the first switch means is a dimmer and passing switch and the second switch means is a turn signal switch.

10. A switching device as set forth in claim 1, wherein the first switch means is a push button switch and the second switch means is a slide switch.

11. A switching device, mounted on a vehicle steering a column, said steering column disposed about a steering shaft fixed at its upper end portion with a steering wheel rotationally operated by an occupant of the vehicle, which comprises:
   (a) a base plate mounted on the steering column in such a manner that an upper face thereof is positioned substantially at a right angle to the revolution axis of the steering shaft;
   (b) a revolution member supported to the base plate and rotatable in a first direction about a first axis about a pair of axial projections formed on the revolution member substantially parallel to the upper face of the base plate, the revolution member including a lever portion extending downward with respect to the disposition of the axial projections and the lever portion including a lower distal end portion;
   (c) an operation lever supported to the revolution member and rotatable in a second direction relative thereto through a pin disposed substantially parallel to the upper face of the base plate and directed substantially at a right angle to the axial direction of the axial projections, the operation lever including an occupant operated knob portion extending upward with respect to the disposition of the pin and a lever portion extending downward with repect thereto, both the operation lever and the revolution member being rotated about the axial projections when the operation lever is rotated in a first predetermined direction and only the operation lever being rotated about a second axis when the operation lever is rotated in a second predetermined direction;
   (d) first switch means mounted on the base plate at a location remote from said first axis, said first switch means abutting with the lower distal end portion of the revolution member and operated in a direction parallel to the pin by the revolution of the revolution member lever portion in the first direction when the operation lever is revolved in said first direction; and
   (e) a turn signal switch mounted on the base plate, operated by the revolution of the lever portion of the operation lever in the second direction when the knob portion is a revolved in the said second direction, whereby the first switch means can securely be operated by the occupant.

12. A switching device as set forth in claim 11, wherein the axial projections of the revolution member are rotatably received in a pair of supporting recesses formed on the base plate, and the revolution member includes a protrusion portion extending upward with respect to the disposition of the axial projections, the operation lever being supported on the protrusion portion through the pin.

13. A switching device as set forth in claim 12, wherein each of the axial projections of the revolution member is formed at its distal portion in a spherical shape and the base plate is formed at upper peripheral portions of the supporting recesses with a pair of projections opposed to each other and covering partially upper openings of the supporting recesses, whereby the axial projections of the revolution member can be forced in the supporting recesses to pass between the projections so that the axial projections are prevented from removing from the supporting recesses.

14. A switching device as set forth in claim 11, which further comprises:
   (f) a bracket supported rotatably on the base plate and connected to the operation lever, whereby the turn-signal switch is operated by the revolution of the operation lever in the second direction through the bracket; and
   (g) a self-cancelling mechanism including a cancelling cam body with a pair of cam projections connected to the steering wheel to be rotated together wherewith, a ratchet supported juxtaposed with and on the bracket rotatable relative thereto and formed with a pair of click portions opposed to the cancelling cam body, and a compression coil spring disposed between the bracket and the ratchet in such a manner that a longitudinal axis thereof is parallel substantially to juxtaposed faces of the bracket and the ratchet to normally bias the ratchet in a neutral position relative to the bracket, whereby when the operation lever is revolved in the second direction, the ratchet is revolved together with the bracket and one of the click portions is positioned within a rotation locus of the cam projections of the cancelling cam body, so that when the steering wheel is rotated in the cancelling direction of the turn signal switch the operation lever is returned back to its initial situation through the ratchet and the bracket.

15. A switching device as set forth in claim 14, wherein the ratchet is formed with vibration restraining means causing the ratchet to abut elastically on an outer peripheral face of the compression coil spring, thereby restraining an occurrence of vibrations in the compression coil spring when the ratchet is returned to the neutral position relative to the bracket after it is revolved relative to the bracket.

16. A switching device is set forth in claim 15, wherein the vibration restraining means is a pair of elastic arms formed on the ratchet about a revolution axis thereof and abutting against a portion of the bracket to bias the ratchet in the direction of the bracket.

17. A switching device as set forth in claim 11, wherein the first switch means is a dimmer and passing switch.

* * * * *